Jan. 9, 1962   E. G. KING III   3,016,129
INSULATED CARRYING CASE FOR HEATED FROZEN
FOOD DINNERS AND THE LIKE
Filed Nov. 14, 1957
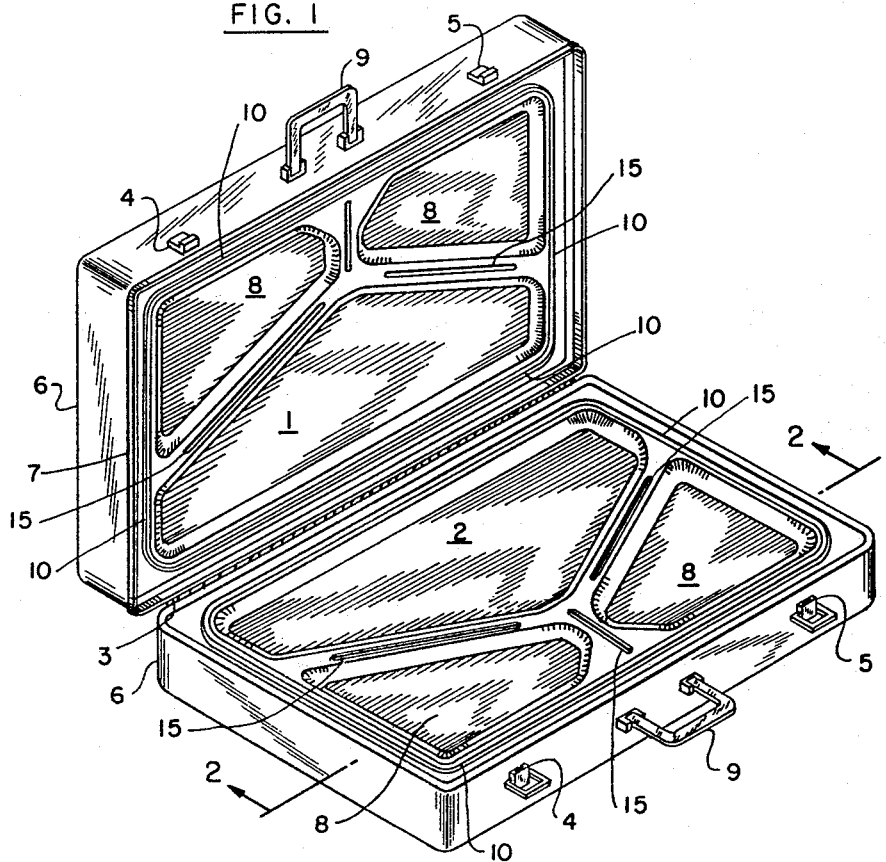
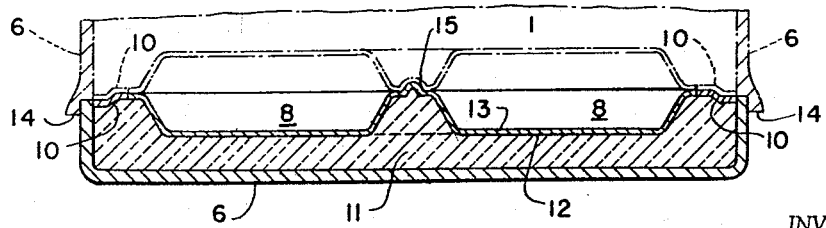
INVENTOR
EDWARD G. KING, III
BY *Leonard Bloom*
ATTORNEY

United States Patent Office 3,016,129
Patented Jan. 9, 1962

3,016,129
INSULATED CARRYING CASE FOR HEATED
FROZEN FOOD DINNERS AND THE LIKE
Edward G. King III, 1004 Wedgewood Road, Baltimore,
Md., assignor of one-half to Joseph Wyniger, Baltimore, Md.
Filed Nov. 14, 1957, Ser. No. 696,493
3 Claims. (Cl. 206—4)

The present invention relates to an insulated carrying case, and more particularly, to an insulated case for carrying heated frozen food dinners and the like.

Despite the conveniences and niceties of our modern civilization and the whole array of labor-saving devices that the creative talents of our inventors have produced, the average working person or school child continues to eat a lunch commensurate with the pre-Civil War era. Nutritional experts generally agree that breakfast and lunch are the two most important meals of the day; and as most people are generally in a rush to be on time, they invariably fail to eat a substantial breakfast. In a considerable number of cases, they eat no breakfast at all. Thus their lunch becomes the basic supply of the day's total energy requirements, and unfortunately, their lunch is usually insufficient or else unbalanced. Moreover, the average person has only about 30 minutes for lunch; and if he is fortunate to have a cafeteria in the building or a restaurant nearby, he usually is required to wait 15-20 minutes to be served. The net result is that the average person has only a few minutes to swallow his food and rush back to work. Such practices will invariably precipitate a gastric disorder, such as acute indigestion or ulcers. The other alternative that is habitually resorted to, is to bring a lunch from home; but such a lunch has as its basic ingredient, one or more cold, dry, tasteless sandwiches that fail to provide a hot, balanced, nutritional meal. It would be desirable, therefore, to combine the nutritional features and varieties of a hot meal such as may be purchased in a cafeteria with the ease, speed, economy, and convenience of a lunch that is carried from the home.

In recent years the housewife's chore of preparing the family's meals has been greatly alleviated by the introduction of specially-prepared, pre-cooked foods that are preserved by canning or freezing. Moreover, complete frozen-food dinners are now available that can be heated in an oven for a few minutes and served piping hot. Such dinners comprise a balanced, hot, nutritional, delicious meal and are relatively inexpensive. A typical frozen-food dinner may feature a choice of either succulent roast turkey with gravy and dressing, or tender roast beef with gravy, or several pieces of golden-brown fried chicken, all with two tasty vegetables. The dinner is heated directly in its container, which usually consists of an aluminum tray divided into three sections and sealed by a cover sheet of aluminum foil. The dinner is usually eaten directly out of its container.

Such a dinner is the ultimate solution to the problem of providing a delicious, low-cost, hot, balanced, nutritional lunch for the average working person or school child, and it would be desirable, therefore, to provide a means of carrying the heated dinner to work or to school or on picnics and keeping it hot for several hours until it is consumed.

Accordingly, it is an object of the present invention to provide an insulated case suitable for carrying heated frozen-food dinners to work, to school, or on picnics, or on hunting, or driving trips, etc.

In accordance with the teachings of the present invention, two insulated sections are hinged together and provided with snaps or latches to form a carrying case that may be held in any desirable position. Each section comprises an outer shell or casing and an inner shell that are fastened together at their perimeters by means of a heat-resisting seal. The void or space between the outer casing and inner shell is then filled with a suitable type of insulation. Each of the inner shells is so formed as to provide a plurality of concavities, usually three, which are separated by the flat surface of the inner shell in order to be compatible with the shape and design of a conventional container for a standard frozen-food dinner. Once the dinner is heated and inserted complete in its container in the lower section, the hinged top section is closed and snapped shut; and the dinner will be kept piping hot for several hours until consumed. In order to prevent the gravies, sauces, or other foods from running together, the flat surfaces of one of the inner shells may be provided with a ridge or series of ridges that mate with a corresponding set of grooves on the flat surfaces of the other inner shell when the hinged sections are brought together. The clearance between the corresponding ridges and grooves is just sufficient to pinch the relatively soft material of the container at the separations between the various courses of the dinner and therefore prevent any of the foods from running together. Thus the insulated carrying case may be held vertically, horizontally, or in any particular position.

The invention will be more readily understood from an inspection of the enclosed drawings, in which:

FIGURE 1 is a pictorial view of the insulated carrying case.

FIGURE 2 is a cut-away view taken at line A—A of the lower half of the case.

With reference to FIGURE 1, top section 1 is hinged to lower section 2 by means of hinge 3, and the two sections are held together when closed by means of snap latches 4 and 5. Each section comprises an outer casing 6 and an inner shell 7, and the inner shells 7 are provided with a plurality of concavities or inserts 8 that are adapted to receive the heated frozen-food dinner complete in its container. When the dinner is inserted in lower section 2, top section 1 is closed over it and secured by means of the snap latches 4 and 5. Handles 9 are provided so that the insulated carrying case may be handled like a brief case.

The outer casing 6 and inner shell 7 of each of the sections 1 and 2 may be made of aluminum, plastic, or any other suitable material, and the space between the inner shell and outer casing may be filled with any appropriate type of insulation, such as asbestos, foamed plastic, or rockwool, or it could even be evacuated.

With reference to FIGURE 2, which is a cut-away view indicative of either section, outer casing 6 (which for example, may be made of aluminum) is fastened to inner shell 7 (which likewise may be made of aluminum, plastic, ceramic, or any suitable material) by means of a heat-resisting insulating seal 10. If aluminum is chosen as the material for both the outer casing 6 and the inner shell 7, then seal 10 may be of neoprene (for example) and may be bonded to outer casing 6 and inner shell 7 by means of an epoxy-type cement for greater rigidity and resistance to creepage. Moreover, the neoprene seal 10 may be of the type which consists of finely-divided particles of aluminum interposed in a matrix of neoprene, so that greater strength and adhesion to the aluminum is obtained along with fairly good insulating properties.

The space between the outer shell 6 and the inner shell 7 is filled with a suitable insulating material 11, such as asbestos, foamed plastic, or rockwool, or any combination thereof, or even a vacuum; and in order to prevent loss of heat by radiation, the inside surface 12 of inner shell 7 may be coated with a flat black paint for radiation absorption, while the outer surface 13 of the inner shell 7 may be silvered, painted, plated, or alse polished to a bright and shiny lustre for radiation reflection.

As shown in both FIGURES 1 and 2, the inner shells 7 are subdivided into a plurality of concavities or inserts 8, two of which are shown in the cut-away view. The inserts 8 are so adapted as to receive a standard size, heated, frozen-food dinner complete in its sectionalized aluminum container. The frozen-food dinner is heated in an oven directly in its container with its cover of aluminum foil left intact. When heated sufficiently, the dinner is placed directly into the insulated carrying case, which keeps it hot for at least 5 or 6 hours. The dinner may then be eaten directly out of its container by merely tearing off its aluminum-foil cover, as would be done ordinarily.

The flat surfaces separating the concavities 8 of the inner shell 7 may be provided with corresponding tongue (or ridge) and groove formations, denoted generally as at 15 in the drawings. Thus, the tongue and groove formation 15, as shown in the drawings, comprises a tongue formed in lower section 2 and a corresponding groove in the top section 1, but of course it is to be understood that the tongue could be on the top section and the groove on the lower section, just as long as a tongue and groove formation 15, or equivalent, is provided. The clearance between the corresponding ridges and grooves is sufficient to pinch together the relatively soft material at the separations of the courses of the heated dinner, thus preventing any of the courses (particularly gravies or sauces) from running together when the carrying case is handled vertically, or in an odd position. Also, the clearance between the corresponding inner shells at their perimeters is just sufficient to grasp and hold the frozen food container rigid within the confines of the carrying case.

Furthermore, the concavities or inserts 8 in the top and bottom sections 1 and 2 are made sufficiently large to accommodate the standard types of frozen-food diners on the market, yet the inserts 8 are sufficiently small to insure a tight fit with relatively few air spaces between the container of the heated dinner and the inner shell. Moreover, the horizontal border-edges of the typical frozen-food dinner will lap over the inserts 8 of the inner shells 7, and since the thickness of the edges is relatively slight and the conventional material relatively soft, the border edges will be squeezed down between the clearance of inner shells 7 when sections 1 and 2 are brought together. As an additional heat-insulating feature, the outer casing of the top section may have a lip or shoulder 14 (as shown in FIGURE 2) that surrounds the extremities of outer casing 6 of the lower section 2 when the two sections are brought together.

Thus a good, snug, tight fit is provided throughout to further enhance the insulating qualities of the carrying case.

It is seen that the present invention fulfills a definite need for an efficient, inexpensive, durable, and attractive carrying case for insulating heated frozen-food dinners and keeping them hot until ready for eating. The invention is thus an excellent solution to the problem of providing a hot, delicious, balanced, nutritional meal together with the speed, ease, convenience, cleanliness, and economy of a lunch that is brought from the home. With virtually no effort at all, a person upon arising could put the frozen-food dinner in the oven and have it ready for insertion into the insulated carrying case in about 20 minutes in time to leave for work. The dinner may then be carried to work very conveniently and kept hot for at least 5 or 6 hours until ready to be eaten. At that time, the hot, delicious dinner is available immediately, and may be enjoyed in a relaxed and peaceful atmosphere.

Naturally, it is apparent that many other modifications and variations to the basic theme could readily be envisioned without departing from the spirit of the invention, and it is, therefore, understood that within the scope of the appended claims the invention may be practiced other than as specifically described.

I claim:

1. An insulated carrying case adapted to snugly house a frozen food dinner complete in its pre-packaged container, comprising, a pair of sections hinged together to form an integral case, each of said sections comprising an outer rectangular casing having a bottom and having adjacent raised wall portions terminating in a continuous exposed edge, and an inner shell having a perimeter which is smaller than the perimeter of said edge of said casing, a continuous band of insulation material disposed therebetween with the inner perimeter of said band being rigidly secured to said perimeter of said shell and with the outer perimeter of said band being rigidly secured to said edge of said casing so as to form a complete and continuous heat-resisting seal between said casing and said respective shell, each of said shells being provided with three cavities recessed below the plane of said edge of said casing and separated one from another by flat surfaces on said shell, each of said cavities of one shell being complementary to a respective one of said cavities of the other shell so as to form three separate compartments when said sections are brought together, said shells and said cavities therein thereby being adapted to snugly house the usual three portions of a typical frozen food dinner, said flat surfaces separating said cavities one from another being provided with complementary tongue and groove formations on respective shells, said tongue and groove formations having a clearance therebetween when said sections are joined together which is just sufficient so that the relatively soft separating portions of a usual package for a frozen food dinner will be pinched together when said sections are closed in order that the individual courses of the meal will be prevented from running together, whereby said carrying case may be held in a variety of convenient positions, and means for locking said sections together.

2. An insulated carrying case as defined in claim 1, wherein said flat surfaces separating said cavities all lie in the same plane and are joined together in a continuous Y-shaped web formation defining three separate compartments when said sections are brought together, one of the compartments being larger than the other two and being adapted to house the main portion of the usual package for a frozen food dinner.

3. An insulating carrying case as defined in claim 1, wherein one of said sections is provided with an outer continuous lip adapted to overlap a portion of said other section when said sections are joined together.

References Cited in the file of this patent

UNITED STATES PATENTS

| | | |
|---|---|---|
| 1,336,776 | Drinkwater | Apr. 30, 1920 |
| 1,831,663 | Hill | Nov. 10, 1931 |
| 2,387,465 | Peltier | Oct. 23, 1945 |
| 2,406,629 | Petkwitz | Aug. 27, 1946 |
| 2,436,097 | Clark | Feb. 17, 1948 |
| 2,457,043 | Histand | Dec. 21, 1948 |
| 2,555,788 | Donaldson | June 5, 1951 |
| 2,606,652 | Jaquette | Aug. 12, 1952 |
| 2,629,042 | Burhleyson | Feb. 17, 1953 |
| 2,679,244 | Fucci | May 25, 1954 |
| 2,767,100 | Clarke | Oct. 16, 1956 |
| 2,817,744 | Free | Dec. 24, 1957 |

FOREIGN PATENTS

| | | |
|---|---|---|
| 506,538 | Canada | Oct. 12, 1954 |